Sheet 1, 2 Sheets.
J. Goulding.
Carding Mach.
No. 1,714. Reissued Jun. 28, 1864.
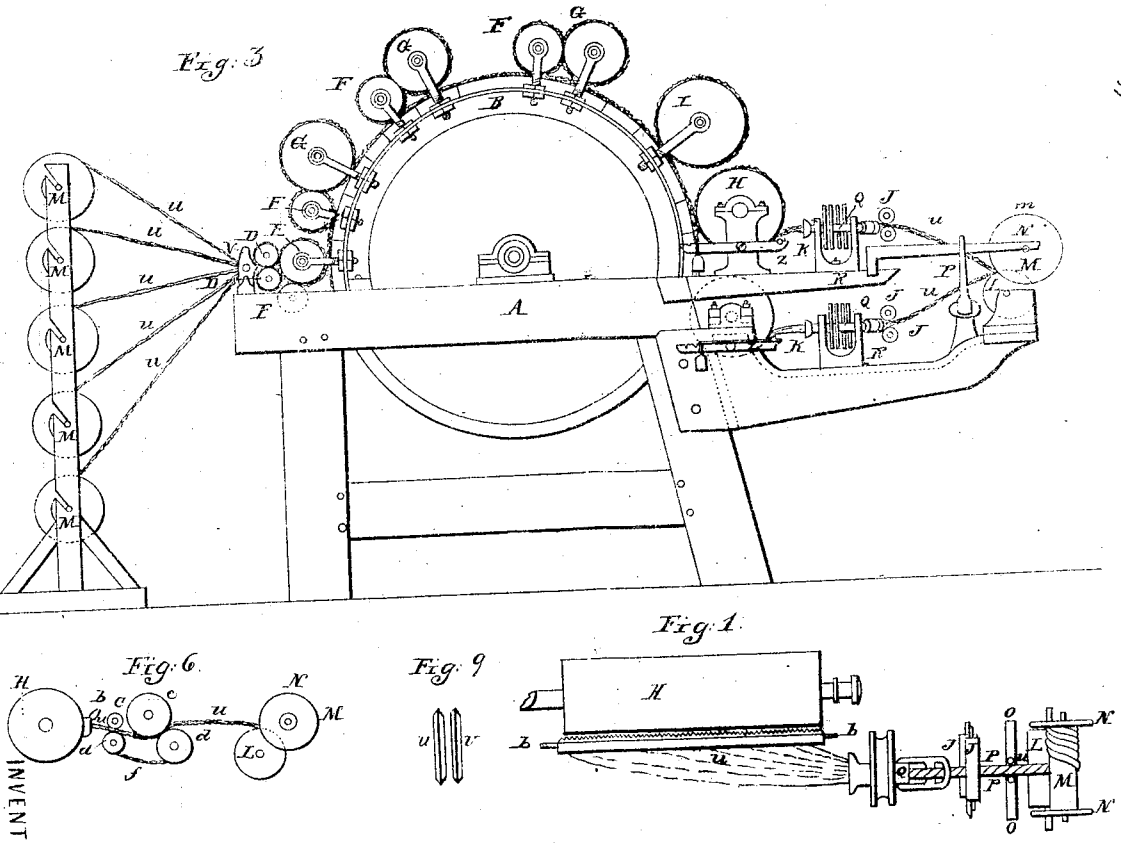
WITNESSES:
O. C. Parsons
B. T. Jackson
INVENTOR:
John Goulding per
H. B. Rommel Atty Sheet 2, 2 Sheets
J. Goulding.
Carding Mach.
No. 1,714. Reissued Jun. 28, 1864.
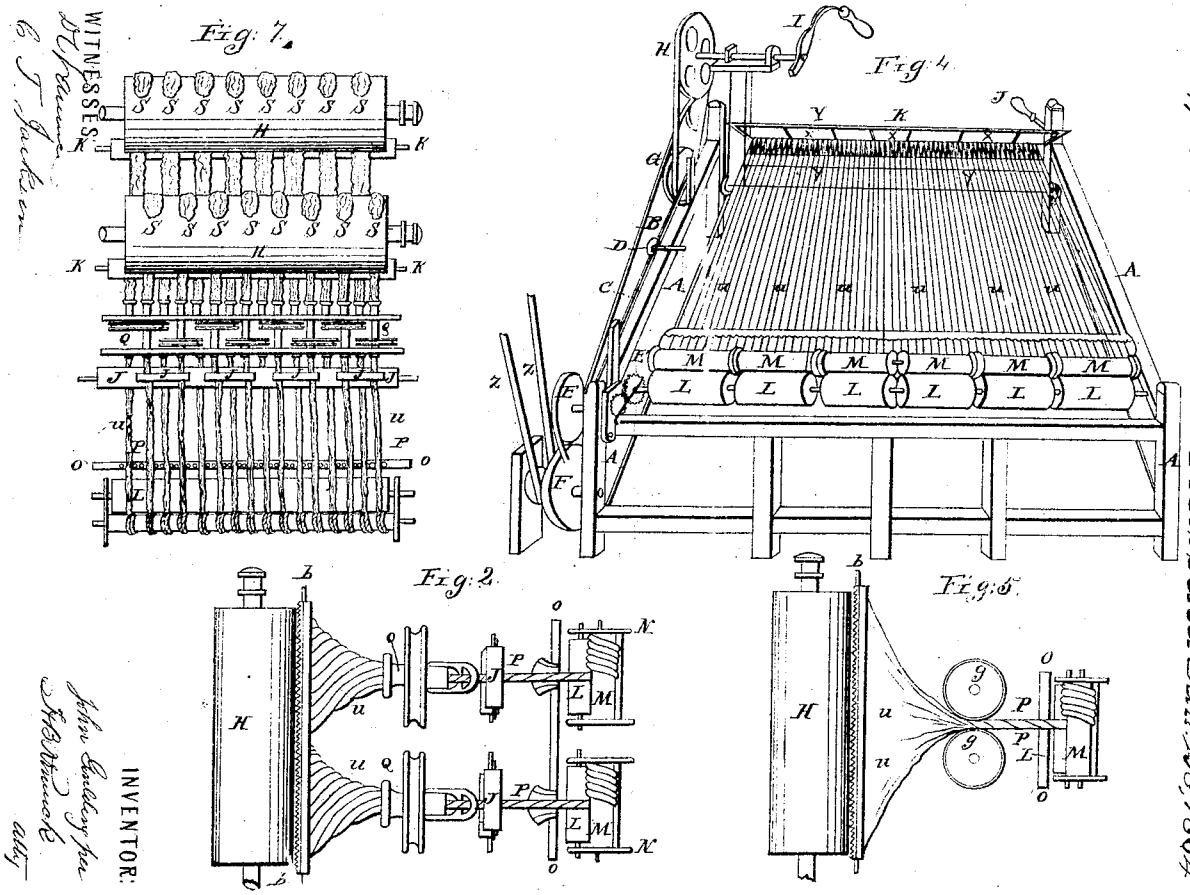
WITNESSES:
D. Kramer
C. T. Jackson
INVENTOR:
John Goulding per
H. B. Kinnicutt
Atty

UNITED STATES PATENT OFFICE.

JOHN GOULDING, OF WORCESTER, ASSIGNOR, BY MESNE ASSIGNMENTS, TO EBEN D. JORDAN, OF BOSTON, MASSACHUSETTS.

IMPROVEMENT IN MACHINERY FOR THE MANUFACTURE OF WOOL AND OTHER FIBROUS MATERIAL.

Specification forming part of Letters Patent dated December 15, 1826; Reissue dated July 29, 1836; extended August 30, 1862; Reissue No. 1,[illegible], dated June 30, 1864.

*To all whom it may concern:*

Be it known that I, JOHN GOULDING, of Worcester, in the county of Worcester, in the Commonwealth of Massachusetts, have invented, constructed, and applied to use a new and useful Improvement in the Mode of Manufacturing Wool or other Fibrous Materials, for which the Letters Patent of the United States of America were granted to me, bearing date on the 15th day of December, in the year of our Lord 1826, which Letters Patent were surrendered and reissued on the 29th day of July, A. D. 1836, and were extended by the Commissioner of Patents on the 30th day of August, A. D. 1862, and the specification thereto annexed, through inadvertence and mistake, not being an exact, full, and precise specification of the invention which the said GOULDING claims as his own, and for which he desired the said Letters Patent should be issued, and there being reason to believe that said Letters Patent are inoperative and invalid by reason that the terms and conditions prescribed by the act of Congress, in such case made and provided, have not by such inadvertence and mistake been complied with on the part of the said GOULDING, now, therefore, I, the said GOULDING, in conformity with the provisions of the act of Congress in such case made and provided, have surrendered the said Letters Patent, and I do now hereby declare that the following contains a full and correct description of the invention which I claim as my own, set forth and specified in those full and exact terms in which it should have been in the specification upon which said Letters Patent were reissued and extended. The more fully to point out said improvement and invention, it is necessary to refer to parts of the machinery which I do not claim, and to the drawings which accompany and are to be considered part of this description and specification.

Figure 1 represents one of the delivering card-rollers H of the first carding-machine, and which is covered all over with a spiral fillet of wire cloth, as usual in such machines.

The great cylinder of the machine is to be regularly fed by means of the common feeding-cloth, upon which a certain weight of wool, cotton, hemp, or other fibrous material, is spread uniformly over a certain space, in the well known and accustomed manner.

I take away the sheet of carded material *u*, previously freed from the delivering card-rollers H by means of the combs *b b*, either laterally to the right or left, by means of two delivering-rollers (shown at J J) through the turning tube or pipe Q, to which a slow rotary movement is given by means of a band passing from a drum actuated by the machine operating upon the pulley affixed to the tube. To the mouth of the tube a loop of brass or iron wire is affixed, having also a bar of wire across it, over which the roving or sliver, after being passed through the tube, is laid, and then passed underneath the loop, in the manner shown. The roving or sliver in passing through the tube is condensed or formed into a loosely-combined cylinder, which is guided between the drawing-rollers J J and thence passed around the bobbin M, which is retained by means of its larger ends, N N, and its axis upon the periphery of the drum L, upon which it rests and partakes of the rotary movement communicated to that drum by the machinery.

The roving or sliver may be evenly wound upon the bobbin M either by carrying it and the drum L backward and forward, or by passing it between guides P P, affixed to the bar O, to which a similar lateral movement is communicated, as will be described.

The apparatus represented in Fig. 2 may also be used in front of the delivering card-roller H. In this apparatus the two carded sheets *u u*, after being taken off from the delivering card-roller H by the comb *b b*, are then passed straight through the rotary tubes Q Q, where, becoming rounded or condensed, they are received between the drawing-rollers J J and put through the guide-pins P P, and finally wound upon the bobbins M M, in the manner before described. The rovings, thus prepared, condensed, drawn off, and wound up by the first carding-machine and the apparatus combined therewith for condensing, drawing, and winding, as before and hereinafter described, are then to be placed in a frame or creel similar to that shown in Fig. 3 of the drawings, and to be passed through the second carding-machine, being guided into it between dividing-pins.

In the second carding process it is expedient that twenty, at least, of the bobbins M M, filled with rovings or slivers from the first carding-machine, should be passed at once through the second machine, if of two feet wide, they being equally distributed along it at the feeding. If they are to be divided into two or more rovings or slivers, then an upright angular block of wood, similar to those shown in Fig. 9, but the breadth of an inch at the broadest end, must be placed at each division, to maintain a similar separation throughout the carding operation.

The wool or other material is taken away from the carding-machine in a fleece or sheet, as shown at U, Fig. 1, where it is seen in its progress toward the conical tube Q and the bobbins M, upon which it is finally wound after receiving a countertwist or condensation by the revolution of the tube Q, or by rollers *g g*, Fig. 5, or by other similar apparatus.

The sliver, slubbing, or roving, whether consisting of one or more strands, is drawn off, condensed, and wound upon the bobbins upon the principle represented in Figs. 1, 2, 3, 5, 6, and 7, and herein described.

The strands in the second carding operation, as before explained, are fed to the card from any requisite number of spools, as at M M, *u u*, Fig. 3, which exhibits the mode of feeding to the third carding-machine and differs in the part marked V from that used in combination with the second carding-machine, the strands being separated and distributed in the second carding operation by means of wire pins or similar apparatus to guide them to their proper places along the card.

The slivers or rovings prepared by the second carding-machine and the apparatus combined therewith are then to be passed through the third carding-machine, which is exhibited in a side elevation, Fig. 3.

A, the machine frame, is shown as being made of wood, but it may be also made of cast-iron. B is the arch which carries the bearings of the carding-cylinders G G and G and clearing-rollers F F, &c.; C, the great or main carding-cylinder; D D, the two feeding rollers, covered with ribbons of wire card, (or channeled or flated rollers may be employed instead of them,) which deliver the rovings or slivers to the receiving card-cylinder E, from which they are transferred upon the great or main carding-cylinder C. The lower small cylinder, F, covered with wire cards, is intended to clear the feeding-rollers D D of any loose fibers which may adhere to it, and being also in slight contact with the receiving-cylinder E, it transports to it those loose fibers. The small cylinder I, covered with wire card, serves partially to disengage and loosen the fibrous material from the surface of the great cylinder C, and to prepare it for being more readily taken off by the delivering-rollers H H. The upper card-cylinders, F F, &c., are for the purpose of clearing the working-cylinders G G, &c., from the wool, cotton, or other fibrous material, and again transferring it to the main cylinder C.

In the third carding operation the strands are fed to the card and conducted so as to cause the sliver, slubbing, or roving to be even and of a uniform size when taken from the delivering-card, being carried through and delivered from the cards separately from each other by means of blocks *v v*.

The bobbins M M, filled with the rovings or slivers from the second carding-machine, are to be placed in a frame, as shown, and each roving or sliver must be passed through a division made in a number of upright wood or metal blocks affixed upon a rail, and one of which is shown at *v*. The blocks must be made broader in front, next to the rollers, than behind, as shown in Fig. 9, which represents the plan of two of them, and the intervals between them must be narrower than the blocks, in the proportion of three to five, or thereabout, so that each roving or sliver may preserve its proper situation upon the main cylinder and the working-cards, without mingling with those next adjacent to it during the operation of carding, and finally be received in its place upon the delivering-cards H.

The two delivering-cylinders H H, being placed one above the other, are each furnished with fillets of card, and alternate spaces between them left unclothed with card, in a similar manner to that shown in Fig. 7, which is a plan of the two delivering-cards H H, &c., and the circular strips or fillets of wire card S S around them, the fillets on the under delivering-card being so placed as to correspond with the spaces left empty upon the uppermost one.

Instead of taking off the carded materials by means of a comb, as described in the references to Figs. 1 and 2, I can remove them from the delivering-cylinders H H by means of the rotary action of the tubes Q Q, &c., upon them, which, gathering the filaments delivered from each fillet of card around the cylinders H H, form them into a continuous and loosely coherent roving or sliver, U, which is drawn by the action of the rollers J J, through which it is passed, being guided between upright pins (shown at P) and wound upon the bobbin M, in the manner already described. In further aid of the rotary action of the tubes Q Q, &c., I can also employ the two plain rollers K K, which are lightly held or pressed against the surfaces of the delivering-rollers H H by the action of weights hung upon the opposite ends of levers which support the rollers K K. At R R are shown the supports or carriages in which the tubes Q Q turn.

The fibers of the rovings or slivers are apt to wind around the drawing rollers J J, &c. In order to prevent this evil it is well to give the uppermost of each pair of rollers a slight degree of lateral motion backward and forward so as to cross their circular motion, and which lateral movement may be effected in various ways by the machinery not necessary to be described here.

The smaller the rovings or slivers become, so much the more will they require to be twisted or condensed by the action of the revolving tubes Q Q upon them in order to give them a sufficient degree of coherence.

The guides P P of the third carding-machine must have a backward and forward lateral motion communicated to them either by a heart-movement, or in any other fit and proper manner, so as to lay the rovings or slivers regularly side by side, each within its own proper limits.

The rovings or slivers being drawn forward by the rollers J J, &c., also pass through the guiders P P, and are wound upon the long bobbin M, actuated by drums L L.

The sliver, slubbing, or roving is twisted or condensed while it is leaving or being delivered from the finishing-cards preparatory to spinning. This twisting admits of the gathering the sliver without the use of the comb or doffer. The twist may be produced by the sliver or roving being passed through tubes, as shown at Q Q, Figs. 2, 3, and 7, or by being passed between pulleys or bands, or other similar means. The sliver is condensed by means of the apparatus shown in Fig. 6 as a substitute for the twisting process.

In case of carding long wool, where it is desirable to keep the fibers straight and smooth—as in the manufacture of worsted, for instance—the wool must be taken off the delivering-card H, Fig. 5, by means of the comb *b*. It then passes between the two vertical rollers $g^1$ $g^2$, which are covered with leather, and have each a slow, alternating, upward and downward movement communicated to them by the machinery, and which, together with the rotary movement of the rollers, draws forward, gathers up, and condenses the carded sheet of wool U. It is then guided between the pins P P, to which the lateral movement is given, as before described, and wound upon the bobbin M. This operation is equally proper for cotton or other fibrous materials, when it is desirable to keep the fibers straight and smooth. In order to render the wool more pliant, it may be heated or moistened by steam or hot water in this latter process.

Another method of drawing forward, condensing, and gathering all descriptions of fibrous substances, after carding them, is seen in an end view at Fig. 6, where H is the delivering card cylinder, *b* the comb which removes the carded material from the cylinder H, and which is then passed underneath the small plain roller C, which is covered with leather, and under the roller *c*, which is also covered with leather, and to both these rollers *c* and *e* a lateral backward and forward movement is given by the machinery, and which varies in extent according to the coarseness or fineness of the carded sliver or roving. The rollers *c* and *e* also receive a rotary movement from the endless web strap or band of leather *f*, and which extends the whole width of the cards and revolves round the rollers *d* *d*, to one of which a rotary movement is communicated by the wheel work of the machine. The transverse rubbing action of the rollers *c* and *e* rounds and condenses the fibers of the carded materials U U, which are afterward wound upon the bobbin M, as before mentioned.

The rotary motion of the delivering-cards H H of the drawing-rollers J J and the drums L L, in all the machines described, must exactly coincide with the nature of the material operated upon, so that the rollers J J shall draw it along as fast as it is freed from the delivering-cards H H, and the drum L L wind it upon the bobbins M M regularly and with proper degree of extension, without overstretching it. Drums L L, actuated by the machinery, may also be used in unwinding the rovings or slivers from the bobbins M M in all cases where the rovings or slivers are too weak to bear drawing off from the bobbins without such help, and whether such slivers or rovings have been made by the machinery herein described, or by other method.

It should be noticed that the bobbins M M upon which the rovings from the third carder are wound are long enough to receive several rovings, and also that all the rovings are condensed, drawn, and wound after they pass from the carding-machines, and that the winding is invariably performed by a drum acting upon the surface of the roving being wound, thus securing uniformity of speed of winding.

It should also be noticed that the mode of feeding the second and third carders requires the use of bobbins to support the rovings to be fed, either revolving by the drag of the carding-machine on the rovings, or being revolved by drums actuated by proper machinery, and also the employment of pins or blocks serving as guides for the rovings.

In the last or third carder the employment of long bobbins, capable of receiving many rovings, saves much space, and in this machine the delivering-cylinders are partly clothed and partly unclothed, as described.

The rovings resulting from the third carding operation are to be furnished to a mule or spinning-frame in which the spindles both draw and twist, the rovings being clamped at intervals during the operation.

Fig. 4 is a general view of part of a mule or spinning-frame. X X X are the spindles; Y, the carriage, made as usual. L is a drum, on the periphery of which the bobbin M containing carded roving or slivers rests, with its axis parallel to the line passing through the spindles, or nearly so, but here, instead of winding the roving or sliver upon the bobbin M, it is employed to give it off at the proper times and in the quantity required for spinning by means of a rotary motion given to the bobbin by the drum in a direction opposite to that in which the bobbin would move to wind up the roving. The motion is given to the drum L from the machine, at the required time, by any fit and proper contrivance, but which need not be described here. The roving or sliver U delivered off from the bobbin M passes between a pair of jaws, W W, which are made to close upon and retain it at proper times, and to open again by the action of machinery, as usual. Or, instead of jaws, grooved or channeled rollers may be employed for a similar purpose. The roving or sliver of wool, if spun without the use of oil, ought not, however, to be stretched more than one-fourth of its length.

I do not claim the individual parts of the machinery used in the several processes before described; but I do claim as follows:

1. In combination, the following sets of apparatus or elements making up a machine—namely: first, a bobbin stand or creel; second, bobbins on which roving may be wound; third, guides or pins; fourth, a carding-machine; fifth, condensing and drawing-off apparatus; and, sixth, winding apparatus—all substantially such as are herein described, whereby rovings may be fed to a carding-machine, carded, condensed, drawn off, and wound again in a condensed state, substantially in the manner hereinbefore set forth.

2. The feed-rollers of a carding-machine in combination with bobbins and proper stands therefor, and guides or pins, whereby slivers or rovings may be fed to be carded by mechanism substantially such as herein described.

3. A delivering-cylinder of a carding-machine in combination with apparatus for drawing off, condensing or twisting, and winding carded filaments, the apparatus being substantially such as herein described, whereby carded filaments may be delivered, drawn off, condensed, and wound, in a condensed state, upon bobbins, as hereinbefore set forth.

4. A mule or spinning-frame provided with spindles mounted on a carriage, and with jaws or their equivalents for retaining roving, in combination with bobbins whose axes are parallel, or nearly so, with the line of spindles, and rest upon drums revolving to unwind the bobbins, the combination being and operating substantially as hereinbefore set forth.

In testimony whereof I have hereunto subscribed my name.

JOHN GOULDING.

In presence of—
D. H. MASON,
C. T. DUNCKLEE.